(12) United States Patent
Iwai et al.

(10) Patent No.: US 9,986,367 B2
(45) Date of Patent: May 29, 2018

(54) COMMUNICATION SYSTEM, RELAY APPARATUS, COMMUNICATION METHOD, AND NON-TRANSITORY COMPUTER READABLE MEDIUM STORING PROGRAM

(71) Applicant: NEC CORPORATION, Minato-ku, Tokyo (JP)

(72) Inventors: Takanori Iwai, Tokyo (JP); Tetsuo Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 20 days.

(21) Appl. No.: 15/038,232

(22) PCT Filed: Jun. 19, 2014

(86) PCT No.: PCT/JP2014/003304
§ 371 (c)(1),
(2) Date: May 20, 2016

(87) PCT Pub. No.: WO2015/075852
PCT Pub. Date: May 28, 2015

(65) Prior Publication Data
US 2016/0295346 A1 Oct. 6, 2016

(30) Foreign Application Priority Data

Nov. 22, 2013 (JP) ................................. 2013-242223

(51) Int. Cl.
*H04W 4/00* (2018.01)
*H04L 12/64* (2006.01)
(Continued)

(52) U.S. Cl.
CPC .............. *H04W 4/005* (2013.01); *H04B 7/15* (2013.01); *H04L 12/6418* (2013.01);
(Continued)

(58) Field of Classification Search
CPC ..................................................... H04W 4/005
See application file for complete search history.

(56) References Cited

U.S. PATENT DOCUMENTS 9,445,441 B2\* 9/2016 Yang ..................... H04W 4/005
9,467,508 B2\* 10/2016 Xu ......................... H04W 4/005
(Continued)

FOREIGN PATENT DOCUMENTS

| JP | 2008-252248 A | 10/2008 |
| JP | 2010-177772 A | 8/2010 |

OTHER PUBLICATIONS

International Search Report for PCT/JP2014/003304 dated Sep. 16, 2014.
(Continued)

*Primary Examiner* — Joseph A Bednash
(74) *Attorney, Agent, or Firm* — Sughrue Mion, PLLC

(57) ABSTRACT

A communication system according to the present invention includes an application server (10) and a relay apparatus (20) that relays a communication between the application server (10) and a communication network (40). The application server (10) comprises a communication unit (11) that transmits to the relay apparatus (20) a first message in which a first identifier has been set as a destination, the first identifier identifying a communication terminal (30) that performs communication via the communication network (40). The relay apparatus (20) includes a converter (21) that converts the first identifier into a second identifier that uniquely identifies the communication terminal (30) in the communication network (40), and a communication unit (22) that transmits a second message in which the second identifier has been set as a destination to the communication terminal (30) via the communication network (40).

19 Claims, 10 Drawing Sheets

(51) Int. Cl.
  H04B 7/15    (2006.01)
  H04W 48/16   (2009.01)
  H04W 48/18   (2009.01)
  H04L 12/66   (2006.01)
  H04W 88/16   (2009.01)
  H04L 29/06   (2006.01)
  H04W 4/14    (2009.01)
  H04L 29/12   (2006.01)

(52) U.S. Cl.
  CPC .......... *H04L 12/66* (2013.01); *H04L 61/2007* (2013.01); *H04L 61/2076* (2013.01); *H04L 69/08* (2013.01); *H04W 4/14* (2013.01); *H04W 48/16* (2013.01); *H04W 48/18* (2013.01); *H04W 88/16* (2013.01)

(56) References Cited

U.S. PATENT DOCUMENTS

2008/0313255 A1* 12/2008 Geltner ............... H04L 12/2859
                                                    709/201
2013/0279372 A1* 10/2013 Jain .................. H04W 4/06
                                                    370/254
2015/0264634 A1*  9/2015 Ding .................. H04W 4/001
                                                    455/434

OTHER PUBLICATIONS

3GPP Generation Partnership Project, "Technical Specification Group Core Network and Terminals; Tsp interface protocol between the MTC Interworking Function (MTC-IWF) and Service Capability Server (SCS)", 3GPP TS 29.368, vol. 11.4.0,, Sep. 2013, pp. 1-21, Sophia Antipolis, Valbonne, France.

"UE to Server solution proposal", Nokia Siemens Networks, Jul. 9-13, 2012, pp. 1-3, SA WG2 Meeting #92, Barcelona, Spain, S2-122993, retrieved from <URL: http://www.3gpp.org/ftp/tsgsa/WG2_Arch/TSGS2_92_Barcelona/Docs/S2-122993.zip>.

Communication dated Apr. 20, 2017 issued by the European Patent Office in counterpart application No. 14864895.9.

* cited by examiner

COMMUNICATION SYSTEM, RELAY APPARATUS, COMMUNICATION METHOD, AND NON-TRANSITORY COMPUTER READABLE MEDIUM STORING PROGRAM

CROSS REFERENCE TO RELATED APPLICATIONS

This application is a National Stage of International Application No. PCT/JP2014/003304 filed Jun. 19, 2014, claiming priority based on Japanese Patent Application No. 2013-242223 filed Nov. 22, 2013, the contents of all of which are incorporated herein by reference in their entirety.

TECHNICAL FIELD

The present invention relates to a communication system, a relay apparatus, a communication method, and a program, and more particularly, to a communication system, a relay apparatus, a communication method, and a program that transmit data to communication terminals that belong to networks different from one another.

BACKGROUND ART

In recent years, a configuration of a network that controls a Machine Type Communication (MTC) terminal that autonomously performs communication without requiring operations by a user or the like has been discussed. For example, a Device Trigger function, which performs communication with the MTC terminal, has been discussed in the 3GPP, which promotes standardizations regarding configurations and functions of mobile networks. The Device Trigger function is a function that is used when a server apparatus (hereinafter it will be referred to as an external server apparatus) that belongs to a network different from the mobile network performs communication with the MTC terminal which belongs to the mobile network. The MTC terminal may also be called a Machine to Machine (M2M) device. For example, Patent Literature 1 discloses a configuration and a flow of processing for executing the Device Trigger function.

In the Device Trigger function, for example, the external server apparatus specifies an MSISDN (it corresponds to the telephone number) allocated to the MTC terminal, and further transmits a small amount of data using a short message service (SMS) to the MTC terminal device. The small amount of data is, for example, data in which the upper limit is predetermined in the SMS and the number of characters that can be sent is limited to tens of characters.

However, the MTC terminal is supposed to be incorporated into non-communication devices, machines or the like other than mobile telephones or smartphone terminals, and it is supposed that the number of MTC terminals incorporated into the non-communication devices or the machines will reach from tens of millions to hundreds of millions. Therefore, if the MSISND is allocated to all the MTC terminals, the MSISDN may be depleted. It has therefore been discussed to allocate, by a communication carrier or the like of the mobile network, an External Identification (External-ID) having a number of digits greater than that of the MSISDN to the MTC terminal and to specify, by the external server apparatus, the External-ID and perform communication with the MTC terminal.

CITATION LIST

Non Patent Literature

[Non-Patent Literature 1] 3GPP TS 29.368 V11.4.0 (2013-09) 3rd Generation Partnership Project; Technical Specification Group Core Network and Terminals; Tsp interface protocol between the MTC Interworking Function (MTC-IWF) and Service Capability Server (SCS) (Release 11)

SUMMARY OF INVENTION

Technical Problem

When the Device Trigger function is used, however, the external server apparatus must manage the MTC terminal using the External-ID that uniquely identifies the MTC terminal in the mobile network when the external server apparatus manages the MTC terminal. That is, the External-ID is an identifier managed by a communication carrier or the like that manages the mobile network and the operator or the like that manages the external server apparatus normally manages the MTC terminal using an identifier different from the identifier managed by the communication carrier or the like. For example, the operator or the like that manages the external server apparatus may manage the MTC terminal by combining the name of the region where the MTC terminal is installed and the serial number or the like of the MTC terminal or by combining the type of the MTC terminal and the serial number or the like of the MTC terminal. As described above, the operator or the like that manages the external server apparatus identifies and manages the MTC terminal according to the management policy of their own company.

However, when the Device Trigger function provided in the mobile network is used, it is required to specify the MTC terminal using the identifier managed by the communication carrier or the like that manages the mobile network. Therefore, the operator or the like that manages the external server apparatus needs to newly provide, for example, a management function or the like to manage the External-ID, in the external server apparatus. Further, the operator or the like that manages the external server apparatus needs to determine various parameters to use the Device Trigger function. This is inconvenient for the operator or the like that manages the external server apparatus when the operator or the like uses the Device Trigger function provided in the mobile network. The Device Trigger function is an example of a function used when the external server apparatus manages the MTC terminal. When the external server apparatus manages the MTC terminal, a function other than the Device Trigger function may be used when the external server apparatus accesses the MTC terminal in the mobile network.

The present invention has been made in order to solve the aforementioned problem and aims to provide a communication system, a relay apparatus, a communication method, and a program in which the external server apparatus is able to easily specify the communication terminal when communication is performed with the communication terminal that belongs to the communication network.

Solution to Problem

A communication system according to a first exemplary aspect of the present invention includes: an application server; and a relay apparatus that relays a communication between the application server and a communication network, in which: the application server includes: a first communication means for transmitting to the relay apparatus a first message in which a first identifier has been set as a destination, the first identifier identifying a communication terminal that performs communication via the communication network; the relay apparatus includes: a conversion means for converting the first identifier into a second identifier that uniquely identifies the communication terminal in the communication network; and a second communication means for transmitting a second message in which the second identifier has been set as a destination to the communication terminal via the communication network.

A relay apparatus according to a second exemplary aspect of the present invention relays a communication between an application server and a communication network, and the relay apparatus including: a conversion means for converting, upon receiving a first message transmitted from the application server, a first identifier into a second identifier, the first identifier being a destination of the first message and identifying a communication terminal that performs communication via the communication network, and the second identifier uniquely identifying the communication terminal in the communication network; and a second communication means for transmitting a second message in which the second identifier has been set as a destination to the communication terminal via the communication network.

A communication method according to a third exemplary aspect of the present invention is a communication method used in a relay apparatus that relays a communication between an application server and a communication network, and the communication method includes: receiving a first message in which a first identifier that identifies a communication terminal that performs communication via the communication network has been set as a destination, the first message being transmitted from the application server; converting the first identifier into a second identifier that uniquely identifies the communication terminal in the communication network; and transmitting a second message in which the second identifier has been set as a destination to the communication terminal via the communication network.

A program according to a fourth exemplary aspect of the present invention is a program executed by a computer apparatus, the computer apparatus relaying a communication between an application server and a communication network, and the program causes the computer to execute the following processing of: receiving a first message in which a first identifier that identifies a communication terminal that performs communication via the communication network has been set as a destination, the first message being transmitted from the application server; converting the first identifier into a second identifier that uniquely identifies the communication terminal in the communication network; and transmitting a second message in which the second identifier has been set as a destination to the communication terminal via the communication network.

Advantageous Effects of Invention

According to the present invention, it is possible to provide a communication system, a relay apparatus, a communication method, and a program in which the external server apparatus is able to easily specify the communication terminal when communication is performed with the communication terminal that belongs to the communication network.

DESCRIPTION OF EMBODIMENTS

First Exemplary Embodiment

Figure 1:
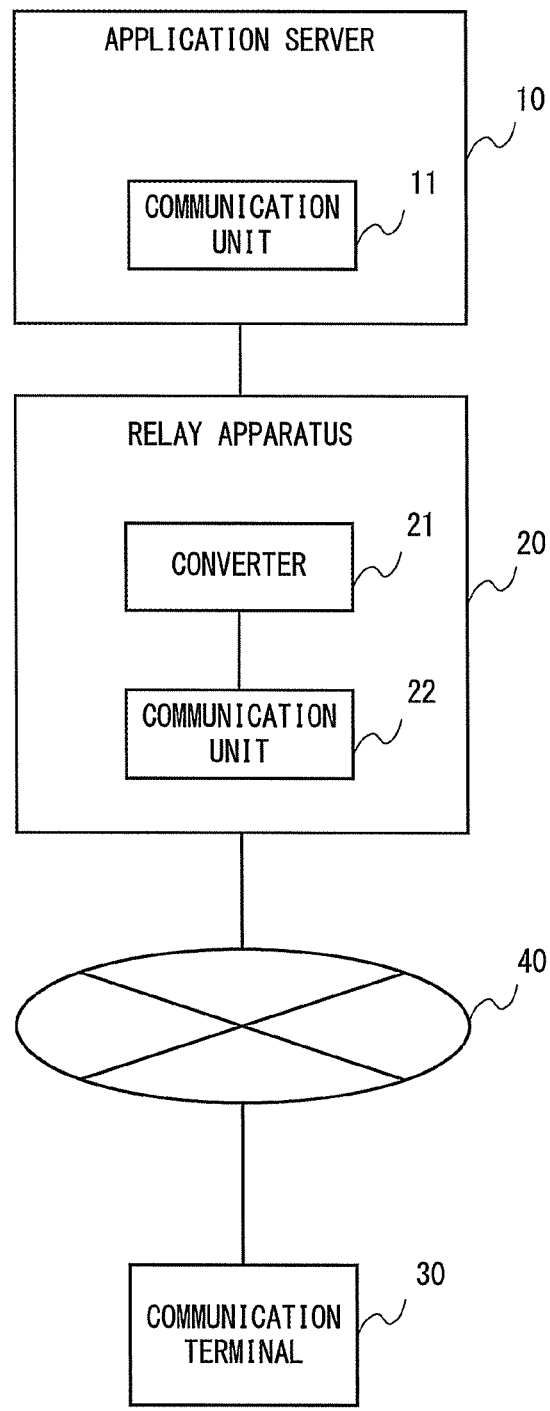
FIG. 1 is a configuration diagram of a communication system according to a first exemplary embodiment.

Hereinafter, with reference to the drawings, exemplary embodiments of the present invention will be described. First, with reference to FIG. 1, a configuration example of a communication system according to a first exemplary embodiment of the present invention will be described. A communication network shown in FIG. 1 includes an application server 10, a relay apparatus 20, and a communication terminal 30. Further, the relay apparatus 20 and the communication terminal 30 communicate with each other via a communication network 40.

The application server 10 is a server apparatus that provides an application service such as transmission of data to the communication terminal 30. The application server 10 may be a computer apparatus that operates by causing a CPU to execute a program stored in a memory.

The application server 10 includes a communication unit 11. The communication unit 11 transmits a message in which an application server management identifier used to identify the communication terminal 30 has been set as a destination to the relay apparatus 20. The application server management identifier is an identifier used, when the application server 10 manages a plurality of communication terminals 30, to uniquely identify each of the communication terminals 30.

The relay apparatus 20 includes a converter 21 and a communication unit 22. The relay apparatus 20 may be a computer apparatus that operates by causing the CPU to execute the program stored in the memory. The converter 21 converts the application server management identifier which is set as the destination of the message sent from the application server 10 into a communication network management identifier. The communication network management identifier is an identifier used to uniquely identify the plurality of communication terminals 30 that belong to the communication network 40. The communication network management identifier may be managed by a server apparatus or the like arranged in the communication network 40.

The converter 21 changes the destination of the message sent from the application server 10 to the communication network management identifier and outputs the message in which the destination has been changed to the communication unit 22. The communication unit 22 transmits the message output from the converter 21 to the communication terminal 30 via the communication network 40. The message may be transmitted to the communication terminal 30 by a Device Trigger function provided in the communication network 40 or by another function provided to achieve the communication with the communication terminal 30.

As described above, the application server 10 sets the identifier of the communication terminal 30 managed by the application server 10 as the destination, whereby the application server 10 is able to transmit the message to the communication terminal 30 that belongs to the communication network 40.

More specifically, the relay apparatus 20 converts the application server management identifier, which is an identifier of the communication terminal 30 managed by the application server 10, into the communication network management identifier that uniquely identifies the communication terminal 30 in the communication network 40. Further, the relay apparatus 20 is able to transmit the message to the communication terminal 30 via the communication network 40 by setting the communication network management identifier as the destination of the message.

By providing the relay apparatus 20 between the application server 10 and the communication network 40 and converting the identifier that identifies the communication terminal 30 in the relay apparatus 20, the application server 10 is able to transmit the message to the communication terminal 30 without using the identifier used in the communication network 40. Therefore, the application server 10 is able to transmit the message to the communication terminal 30 without managing the communication network management identifier that uniquely identifies the communication terminal 30 in the communication network 40. Therefore, even when the application server 10 transmits the message to the communication terminal 30 that belongs to the communication network 40, there is no need to provide a function of managing the communication network management identifier of the communication terminal 30.

Second Exemplary Embodiment

Next, with reference to FIG. 2, a configuration example of a communication system according to a second exemplary embodiment of the present invention will be described. The communication system according to this embodiment includes an application server 50, an M2M platform 60, a Network Service Function Entity (NSE) 70, and an M2M device 80. Further, the NSE 70 is an apparatus that is arranged in a mobile network 75. The apparatus that is arranged in the mobile network 75 means an apparatus that is arranged based on a management policy, a design policy or the like of a communication carrier or the like that manages the mobile network 75.

Further, the M2M platform 60 is connected to the mobile network 75 and also to communication networks 77 and 79 different from the mobile network 75. That the M2M platform 60 is connected to the mobile network or the communication network means that it performs communication with a node apparatus or the like arranged in the mobile network or the communication network. In FIG. 2, the M2M device 80 belongs to the mobile network 75.

The application server 50 corresponds to the application server 10 shown in FIG. 1. The M2M platform 60 corresponds to the relay apparatus 20 shown in FIG. 1. The mobile network 75 corresponds to the communication network 40 shown in FIG. 1. The M2M device 80 corresponds to the communication terminal 30 shown in FIG. 1.

The mobile network 75 is, for example, a network defined by the 3GPP. The NSE 70 is, for example, a node apparatus that constitutes the network defined by the 3GPP.

The part between the application server 50 and the M2M platform 60 is defined, for example, to be an Mca interface by oneM2M, which promotes standardizations of service layers in M2M communications. The application server 50 and the M2M platform 60 perform communication using a message format or the like defined by the Mca interface.

The part between the M2M platform 60 and the NSE 70 is defined, for example, to be an Mcn interface by oneM2M. Further, the part between the M2M platform 60 and the M2M device 80 is defined, for example, to be an Mcc interface in oneM2M. The names of the above interfaces are not limited to the Mca interface, the Mcn interface, and the Mcc interface and may be changed as appropriate in the process of promoting standardizations in oneM2M.

Further, the part between the NSE 70 and the M2M platform 60 may be defined to be a Tsp interface in the 3GPP. The name of the above interface is not limited to the Tsp interface and may be changed as appropriate in the process of promoting standardizations in the 3GPP.

The communication networks 77 and 79 are different from the mobile network 75 and may be managed, for example, by a communication carrier different from the communication carrier that manages the mobile network 75. Alternatively, the communication networks 77 and 79 may be networks in which the communication systems are different from the communication system in the mobile network 75. The network in which the communication system is different from that in the mobile network 75 includes, for example, a fixed communication network or a wireless LAN.

Further, the M2M platform 60 may be a common service entity (CSE), which is an apparatus that achieves functions defined by oneM2M. Further, the M2M platform 60 may be an apparatus that includes a plurality of CSEs. Further, the M2M platform 60 may be referred to as an Infrastructure Node (IN)-CSE, using the term used in oneM2M. Further, the M2M device 80 may be referred to as an Application Service Node (ASN)/Middle Node (MN)-CSE, using the term used in oneM2M. Further, the application server 50 may be referred to as an AE, using the term used in oneM2M.

Figure 3:
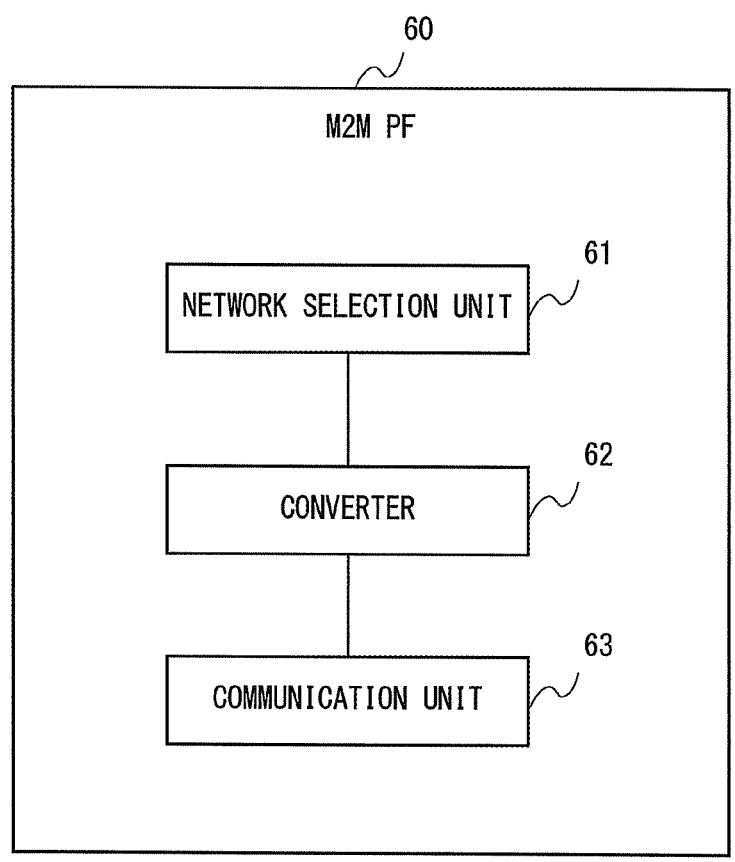
FIG. 3 is a configuration diagram of an M2M platform according to the second exemplary embodiment.

Next, with reference to FIG. 3, a configuration example of the M2M platform 60 will be described. The M2M platform 60 includes a network selection unit 61, a converter 62, and a communication unit 63. Since the converter 62 corresponds to the converter 21 shown in FIG. 1 and the communication unit 63 corresponds to the communication unit 22 shown in FIG. 1, detailed descriptions thereof will be omitted.

When the message in which the M2M device 80 has been set as a destination is sent from the application server 50, the network selection unit 61 selects which one of the mobile network 75 and the communication networks 77 and 79 should be used to transmit the message to the M2M device 80. The network selection unit 61 may select, for example, a network managed by the communication carrier with which the M2M device 80 has made a contract. Alternatively, the network selection unit 61 may select, when the M2M device 80 is able to perform communication via two or more networks among the mobile network 75 and the communication networks 77 and 79, a network using QoS information such as a congestion state in each network, the number of terminals that are connected to the respective networks, and throughput or delay in each network.

Further, the network selection unit 61 may select a plurality of networks and transmit the above message to the M2M device 80 via the respective networks when the M2M device 80 is able to perform communication via two or more networks among the mobile network 75 and the communication networks 77 and 79. By sending the message to the M2M device 80 via the plurality of networks, it is possible to increase the probability that the message is delivered to the M2M device 80. When the same message is transmitted via a plurality of networks, the M2M device 80 may discard all but one of the messages or combine the plurality of networks.

Figure 2:
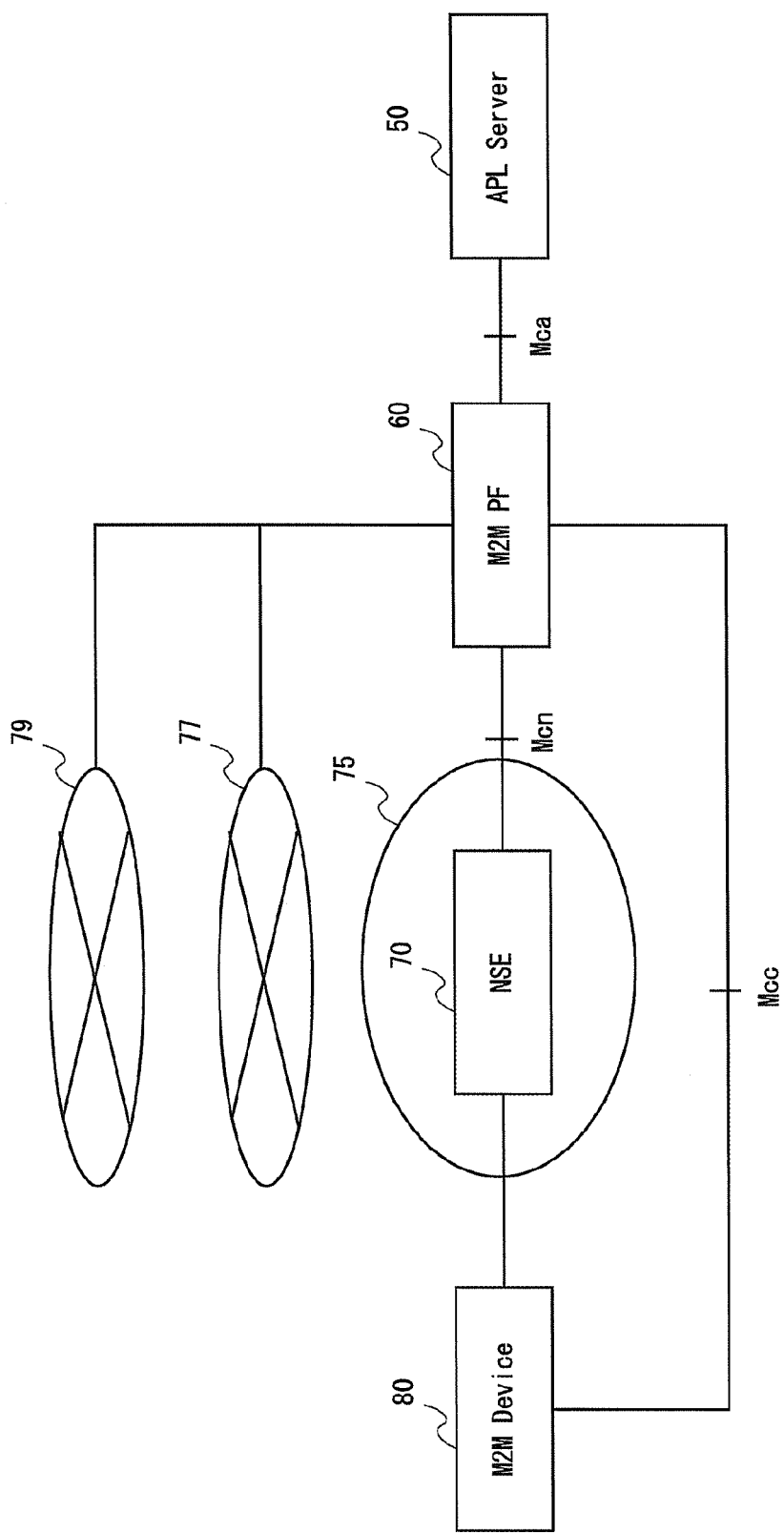
FIG. 2 is a configuration diagram of a communication system according to a second exemplary embodiment.
Figure 4:
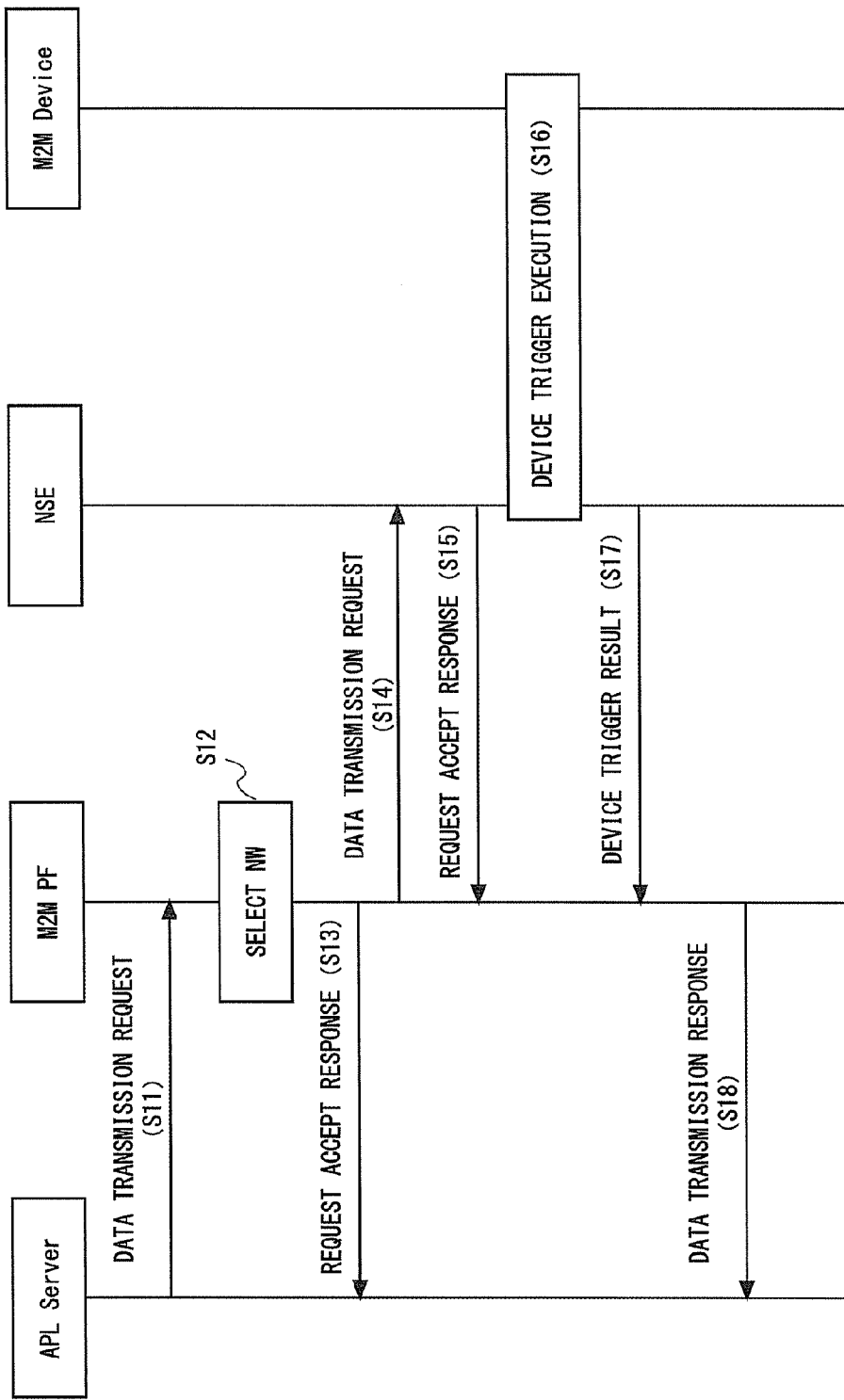
FIG. 4 is a diagram showing a flow of data transmission processing according to the second exemplary embodiment.

In the description regarding FIGS. 2 and 4, an example in which the network selection unit 61 selects the mobile network 75 is explained.

The network selection unit 61 outputs the information regarding the network that has been selected to the converter 62.

The converter 62 converts the identifier which has been set as a destination of the message sent from the application server 50 into an identifier used in the network selected in the network selection unit 61. When an External-ID is used to identify the M2M device 80 in the network selected in the network selection unit 61, for example, the converter 62 sets the External-ID corresponding to the M2M device 80 as the destination of the message. Further, when an identifier different from the External-ID is used in the network selected in the network selection unit 61, the converter 62 converts the identifier which has been set as a destination of the message sent from the application server 50 into an identifier used in the network that has been selected. The identifier of the M2M device 80 may not be the External-ID, and may be, for example, a device number, a MAC address or the like of the M2M device 80.

The M2M platform 60 may store a database or the like in which the identifier used to identify the M2M device 80 in the application server 50 is associated with the identifier used to identify the M2M device 80 in each network in a memory in the M2M platform 60. Alternatively, the database may be managed in another device. In this case, the converter 62 may access the other device that manages the database and acquire the identifier associated with the identifier which has been set as the destination of the message sent from the application server 50.

Further, the converter 62 converts the format of the message transmitted from the application server 50 into a message format of a system used when the message is transmitted to the M2M device 80 in the network selected in the network selection unit 61. The system used when the message is transmitted may be, for example, Device Trigger, SMS, or IP PUSH. In other words, the converter 62 converts the format of the message transmitted from the application server 50 into a protocol format used when the message is transmitted to the M2M device 80 in the network selected in the network selection unit 61.

The communication unit 63 transmits the message in which the identifier of the destination has been converted in the converter 62 to the M2M device 80 via the network selected in the network selection unit 61.

Further, the M2M platform 60 may include, besides the aforementioned structures, a structure for executing charging processing. As the charging processing, the M2M platform 60 may specify, for example, the amount of data of the message transmitted from the application server 50 and generate charging detail data or the like to which a charging rate according to the amount of data has been applied. Alternatively, the M2M platform 60 may count the number of times that the message has been transmitted according to a request from the application server 50 and generate charging detail data or the like according to the number of times that the message has been transmitted.

Next, with reference to FIG. 4, a flow of the data transmission processing according to the second exemplary embodiment of the present invention will be described. First, the application server 50 transmits a data transmission request message to the M2M platform 60 (S11). The M2M device 80 is set as the destination of the data transmission request. Further, the application server management identifier managed by the application server 50 is used as the identifier of the M2M device 80.

Next, the M2M platform 60 selects a network to be used to transmit data to the M2M device 80 (S12). Next, the M2M platform 60 transmits a request accept response message to the application server 50 in order to notify the application server 50 that it has accepted the data transmission request message (S13). Next, the M2M platform 60 transmits the data transmission request message to the NSE 70 arranged in the network selected in Step S12 (S14). At this time, the M2M platform 60 transmits the data transmission request message after converting the identifier of the M2M device 80 set as the destination into the identifier used in the network that has been selected.

Next, the NSE 70 transmits the request accept response message to the M2M platform 60 in order to notify the M2M platform 60 that it has accepted the data transmission request message (S15).

Next, the NSE 70 transmits the message to the M2M device 80 using a device trigger function (S16). The device trigger function will now be described in detail. When the device trigger function is executed, the M2M platform 60 transmits a Device Trigger request to the NSE 70. The NSE 70 may be, for example, an MTC-IWF entity defined in the 3GPP. The Device Trigger request includes, for example, the following information.

3GPP External Identifier or MSISDN
ASN-CSE Identifier
trigger reference number
validity period
priority
Application Port ID
triggerpayload The Device Trigger request is transferred to an SMS-SC, which is the NSE 70, in the mobile network 75 defined by the 3GPP and is transmitted to the M2M device 80 via an SM Router or the like as a Short Message signal. At this time, a protocol identifier of "Device Trigger Short Message" is set in the Short Message signal. Therefore, in a Device Trigger Short Message reception side such as the SM Router or the target SM entity, it is possible to check and reject the transmission-side entity, the validity of the signal or the like.

After the device trigger is executed in Step S16, the NSE 70 transmits a device trigger result message to the M2M platform 60 to send the device trigger execution result (device trigger report) (S17). The device trigger execution result is information indicating whether the message transmitted from the NSE 70 has reached the M2M device 80, that is, whether the M2M device 80 has received the message transmitted from the NSE 70 without any problem.

The device trigger execution result may include the reason why the message has not been delivered to the M2M device 80 or the like.

Next, the M2M platform 60 transmits a data transmission response message (data transmission report) to the application server 50 as a response message in response to the data transmission request message transmitted in Step S11 (S18). The M2M platform 60 sets the device trigger execution result transmitted from the NSE 70 for the data transmission response message.

Figure 5:
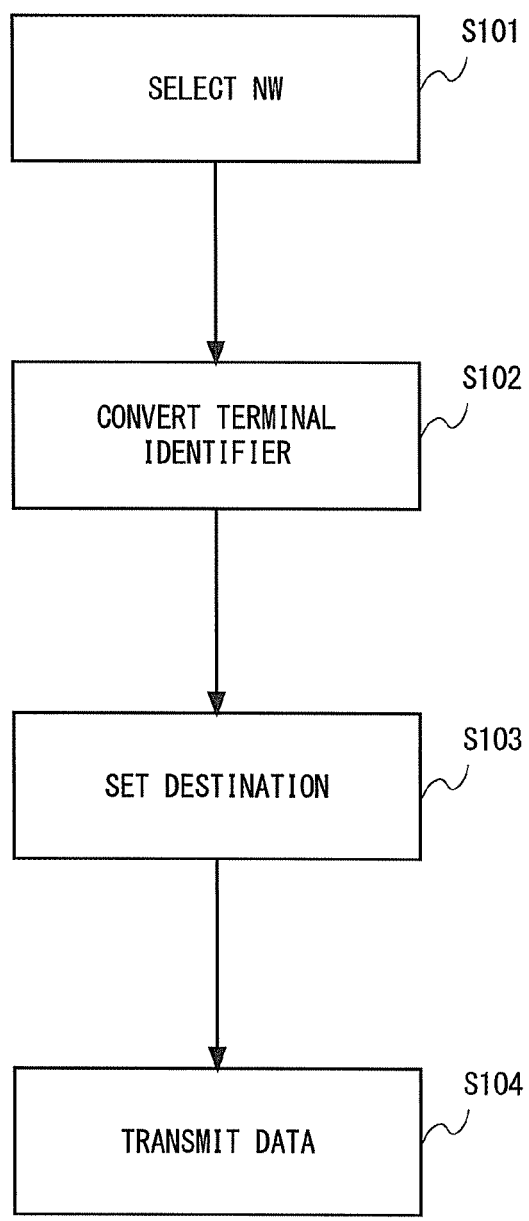
FIG. 5 is a diagram showing a flow of data transmission processing in the M2M platform according to the second exemplary embodiment.

Next, with reference to FIG. 5, a flow of the data transmission processing in the M2M platform 60 according to the second exemplary embodiment of the present invention will be described. First, the network selection unit 61 selects a network to be used to transmit the message to the M2M device 80 from the plurality of networks (S101). Next, the converter 62 converts the identifier of the M2M device 80 set as the destination of the message transmitted from the application server 50 into an identifier used in the network that has been selected (S102).

Next, the converter 62 sets the identifier that has been converted as the destination of the message (S103). Next, the converter 62 transmits the message in which the destination has been converted to the M2M device 80 via the network that has been selected (S104).

As described above, by using the communication system according to the second exemplary embodiment of the present invention, the application server 50 is able to request the M2M platform 60 to transmit data without considering, for example, the protocol, the data format or the like used in the mobile network 75.

The M2M platform 60 is arranged between the application server 50 and the NSE 70 and is able to relay the communication between the application server 50 and the NSE 70 by using the protocols, the data formats or the like defined between the M2M platform 60 and the respective devices. That is, when the application server 50 and the NSE 70 use the protocols, the data formats or the like different from each other, the M2M platform 60 is able to relay the communication between the application server 50 and the NSE 70 by converting the information.

Further, when a plurality of networks are connected to the M2M platform 60 as shown in FIG. 2, the M2M platform 60 converts the data transmitted from the application server 50 into the protocol or the message format used in each network. The application server 50 is therefore able to transmit data to the M2M device 80 via one of the networks connected to the M2M platform 60.

Third Exemplary Embodiment

Figure 6:
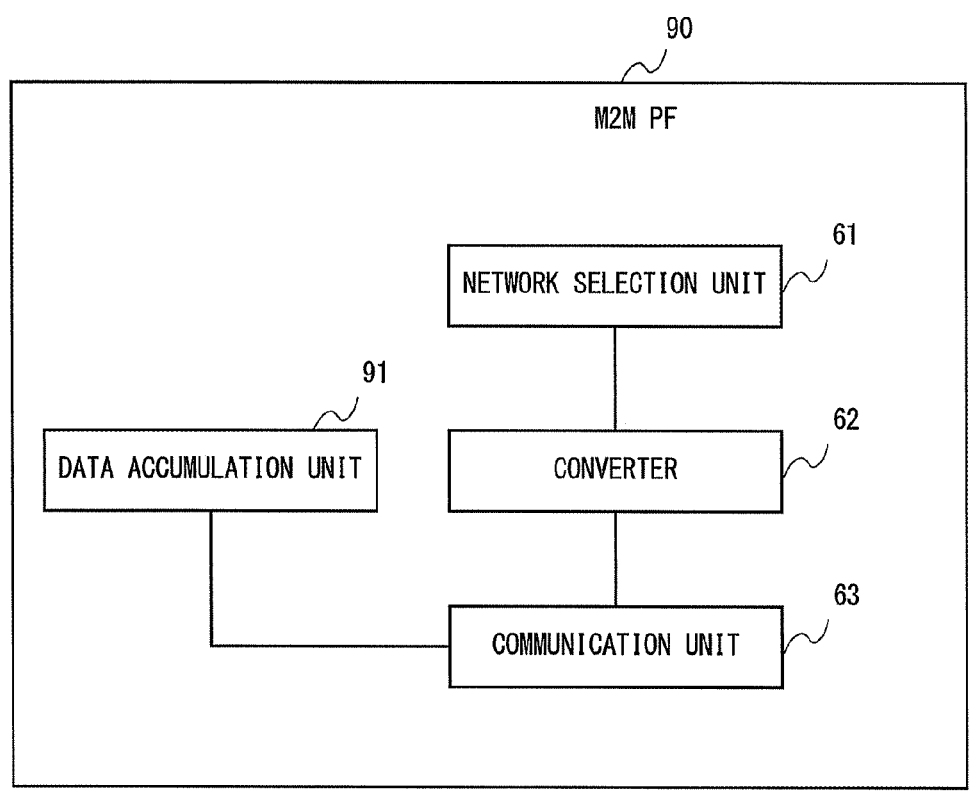
FIG. 6 is a configuration diagram of an M2M platform according to a third exemplary embodiment.

Next, with reference to FIG. 6, a configuration example of an M2M platform 90 according to a third exemplary embodiment of the present invention will be described. The M2M platform 90 has a configuration in which a data accumulation unit 91 is added to the M2M platform 60 shown in FIG. 3. Since the network selection unit 61, the converter 62, and the communication unit 63 are the same as those in the M2M platform 90, detailed descriptions thereof will be omitted.

The data accumulation unit 91 temporarily accumulates the data transmitted from the application server 50. The size of the data that the M2M platform 90 can transmit in the Device Trigger function to the M2M device 80 via the NSE 70 is predetermined. When data is transmitted using the SMS in the Device Trigger function, the upper limit of the number of characters is predetermined.

In the above case, when the size of the data transmitted from the application server 50 exceeds the predetermined data size, the M2M platform 90 temporarily accumulates the data that has been transmitted in the data accumulation unit 91. The M2M platform 90 uses the Device Trigger function to allow the M2M device 80 to be connected to the mobile network 75. The M2M platform 90 transmits data to the M2M device 80 after connecting the M2M device 80 to the mobile network 75.

Figure 7:
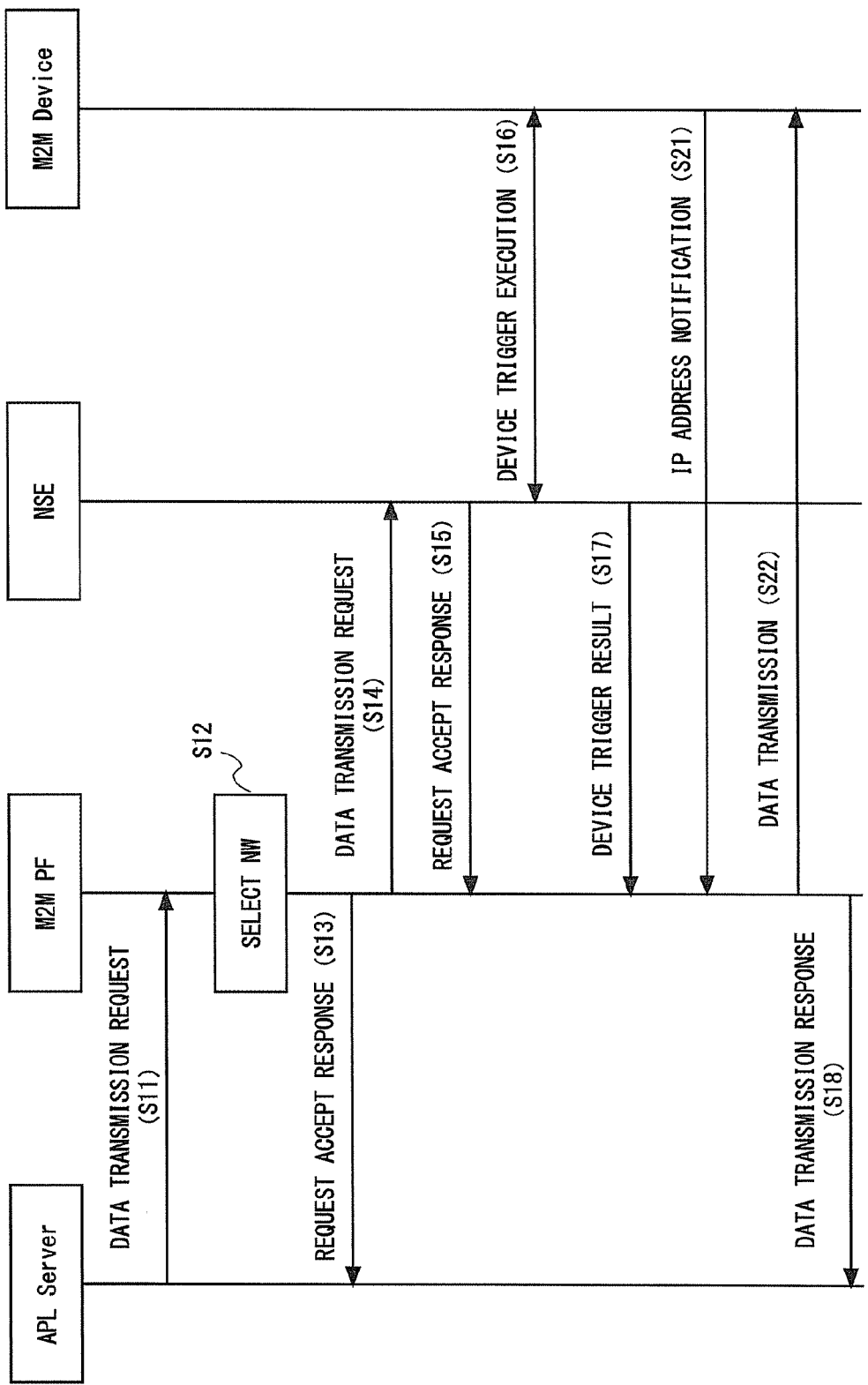
FIG. 7 is a diagram showing a flow of data transmission processing according to the third exemplary embodiment.

With reference to FIG. 7, a flow of processing when data whose size exceeds the size of the data that can be transmitted in the Device Trigger function is transmitted from the application server 50 will be described.

Since Steps S11 to S18 in FIG. 7 are similar to Steps S11 to S18 in FIG. 4, detailed descriptions thereof will be omitted. A calling control is performed for the M2M device 80 by the NSE 70 as a result of the execution of the Device Trigger function in Step S16. The calling control may also be called a paging control. The M2M device 80 responds to the message regarding the calling control from the NSE 70 so that it is connected to the mobile network 75.

That the M2M device 80 is connected to the mobile network 75 means a state in which, for example, the base station that belongs to the mobile network 75 allocates communication resources to the M2M device 80 in order to perform communication with the M2M device 80. In other words, that the M2M device 80 is connected to the mobile network 75 means a state in which the location of the M2M device 80 is specified by the calling control and data can be exchanged between the M2M device 80 and the base station. When the M2M device 80 does not perform the IP communication for a predetermined period of time after it has been connected to the mobile network 75, the communication resources allocated to the M2M device 80 are released. Even in such a case, the M2M device 80 can be connected to the mobile network 75 by using the Device Trigger function.

The M2M device 80 is connected to the mobile network 75, whereby the IP address is allocated from another node apparatus arranged in the NSE 70 or the mobile network 75.

The M2M device 80 transmits an IP address notification message to notify the M2M platform 90 of the IP address that has been allocated (S21). The M2M device 80 transmits the IP address notification message to the M2M platform 90 via the Mcc interface.

Further, while the example in which the M2M device 80 notifies the M2M platform 90 of the IP address has been described in Step S21, the M2M platform 90 may acquire the IP address of the M2M device 80 using another method. The M2M platform 90 may acquire, for example, IP address information allocated to the M2M device 80 from a server apparatus or the like that has allocated the IP address to the M2M device 80 in the mobile network 75.

Alternatively, the M2M platform 90 may acquire the IP address of the M2M device 80 using Device Bootstrapping, which is defined by the European Telecommunications Standards Institute (ETSI), which is an organization that promotes standardizations of electric communications in Europe. The Device Bootstrapping is a function of registering information on the M2M device 80 in the server apparatus or the like when the M2M device 80 is connected (attached) to the mobile network defined by the 3GPP. The server apparatus may be, for example, the M2M platform 90. For example, in the Device Bootstrapping, the IP address of the M2M device 80 is registered in the M2M platform 90 as a part of the information on the M2M device 80. That is, in Step S16 of FIG. 7, the M2M device 80 is connected to the mobile network 75 using the Device Trigger function. Then the Device Bootstrapping is used, whereby the M2M platform 90 is able to acquire the IP address of the M2M device 80.

Now, details of the processing when the IP address of the M2M device 80 is registered in the M2M platform 90 in the Device Bootstrapping will be described. First, it is required to perform Provisioning of fixed information required to access the M2M platform 90 for the M2M device 80. The procedure for performing the Provisioning of the fixed information for the M2M device 80 may be referred to as an M2M Service Bootstrap.

For example, in the M2M Service Bootstrap, the following fixed information is provisioned for the M2M device 80. The information that is provisioned is not limited to the following information.
device ID (the identifier of the M2M device 80)
M2M route KEY (key information used when access authentication is performed)
List of NSCL-ID (ID of the M2M platform 90 or the M2M System to which the M2M device 80 accesses)

A method for performing Provisioning includes Pre-Provisioning (preliminary setting) and Bootstrapping (setting at the time of the start-up). Further, Bootstrapping (setting at the time of the start-up) includes the following methods:
Bootstrap assisted by Access Network (Bootstrap method in association with the access network); and
Bootstrap without assistance from Access Network (Bootstrap method independent from the access network).

Further, the Bootstrap assisted by Access Network includes a General Bootstrapping Architecture (GBA)-based method and an EAP-SIM/EAP-AKA (EAP)-based method. The GBA-based method and the EAP-based method are methods defined in the 3GPP standard and the detailed descriptions thereof will be omitted.

As described above, after the Provisioning is executed in the M2M Service Bootstrap, the M2M Service Connection is executed. The M2M Service Connection accesses the M2M platform 90 from the M2M device 80 based on the fixed information set in the M2M device 80. Next, a mutual authentication between the M2M device 80 and the M2M platform 90 is carried out and the M2M connection KEY is further distributed. As optional processing, processing for ensuring the security of the communication path between the M2M device 80 and the M2M platform 90 may be carried out. When the secure communication using the communication path in which the security is ensured is performed, the M2M connection KEY that has been distributed is used. Since the M2M Service Connection is executed, the M2M device 80 is registered in the M2M platform 90. Further, since the M2M device 80 is registered in the M2M platform 90, the M2M device 80 receives and holds the IP address information on the M2M platform 90 and the M2M platform 90 receives and holds the IP address information on the M2M device 80.

As described above, the M2M device 80 holds the IP address information on the M2M platform 90 and the M2M platform 90 holds the IP address information on the M2M device 80. Therefore, when the M2M device 80 is being activated, the IP address of the M2M device 80 can be used for the subsequent communications, whereby it is possible to efficiently perform the communication using the IP communication.

Next, when the M2M device 80 is registered in the M2M platform 90, the M2M device 80 transmits a request for generating SCL resources to the M2M platform 90. Upon receiving the request for generating the SCL resources, the M2M platform 90 generates new remote SCL information on NSCL resources and sends a reply to the M2M device 80.

Upon receiving the reply, the M2M device 80 generates the new remote SCL information on D/GCSL resources thereof and sends a reply to the M2M platform 90. The association between the D/GSCL resources of the M2M device 80 and the NSCL resources of the M2M platform 90 is thus formed. Further, the IP address information (or remote IP address information) held in the M2M Service Connection may be held again as one of information elements of the remote SCL. As described above, by holding or managing the IP address information as one of the information elements of the remote SCL, the memory resources can be efficiently used.

Next, by registering the application of the M2M device 80 in the D/GSCL, the communication between the NSCL and the DA/GA can be performed via the D/GSCL. Further, by registering the application server in the NSCL, the communication between the NA and the DA/GA can be performed via the NSCL and the D/GSCL.

Now, the Lifetime of the information registered in the M2M device 80 or the M2M platform 90 will be described. The fixed information registered in the M2M device 80 or the M2M platform 90 includes, for example, fixed information that is set when a contract for using the M2M platform 90 is made, fixed information that is set when the M2M device 80 is activated for the first time, and information that is updated in the second and subsequent activations of the M2M device 80.

The fixed information that is set when the contract is made is set in the M2M device 80 or the M2M platform 90 by an off-line operation when the contract is made. Therefore, the timing when the fixed information that is set when the contract is made is updated or deleted should be when the contract is changed or cancelled. The fixed information that is set when the contract is made includes, for example, a device ID, a password, or a contract plan.

The Lifetime of the fixed information that is set when the M2M device 80 is activated for the first time may be basically the same as that of the fixed information that is set when the contract is made. That is, the timing of the update or the cancellation may be the same as that of the fixed information that is set when the contract is made. The fixed information that is set when the M2M device 80 is activated for the first time includes, for example, a device ID, key information generated from a password, and an access target ID (or FQDN). The access ID may be updated according to the location to be accessed.

The information that is updated in the second and subsequent activations of the M2M device 80 is the M2M connection KEY and the IP address information, and may further include information indicating the activation state of the M2M device. The Lifetime of the information may be, for example, until the time that the power supply of the M2M device 80 is turned off. The Lifetime of the information may be set according to the subsequent processing of the communication request of the M2M device 80.

In the following processing, in the resource link between the D/GSCL and the NSCL, a periodic update or a bidirectional update on demand is performed.

Further, the M2M platform 90 may acquire, for example, both the IP address sent from the M2M device 80 and the IP address sent from the Device Bootstrapping. If the IP address sent from the M2M device 80 is different from the IP address sent from the Device Bootstrapping, the M2M platform may request the NSE 70 to execute the device trigger function. According to the above operation, the M2M device 80 is re-connected to the mobile network 75 and is newly assigned with the IP address. Further, the M2M platform 90 may acquire the IP address that has been newly allocated to the M2M device 80 by the Device Bootstrapping and update the IP address regarding the M2M device 80 that the M2M platform 90 holds.

Referring back to FIG. 7, the M2M platform 90 then transmits data accumulated in the data accumulation unit 91 to the M2M device 80 by IP data communication (S22). In the IP data communication, unlike the SMS, the upper limit of the data size is not predetermined. The M2M platform 90 is therefore able to transmit the data accumulated in the data accumulation unit 91 to the M2M device 80.

As described above, by using the flow of the data transmission processing according to the third exemplary embodiment of the present invention, the M2M device 80 is able to notify the M2M platform 90 of the IP address allocated for the communication in the mobile network 75. The M2M platform 90 further includes the data accumulation unit 91 that accumulates the data transmitted from the application server 50. Therefore, the M2M platform 90 is able to transmit to the M2M device 80 the data that cannot be transmitted when the SMS is used since the upper limit of the data size is predetermined in the SMS by the IP data communication.

Fourth Exemplary Embodiment

Figure 8:
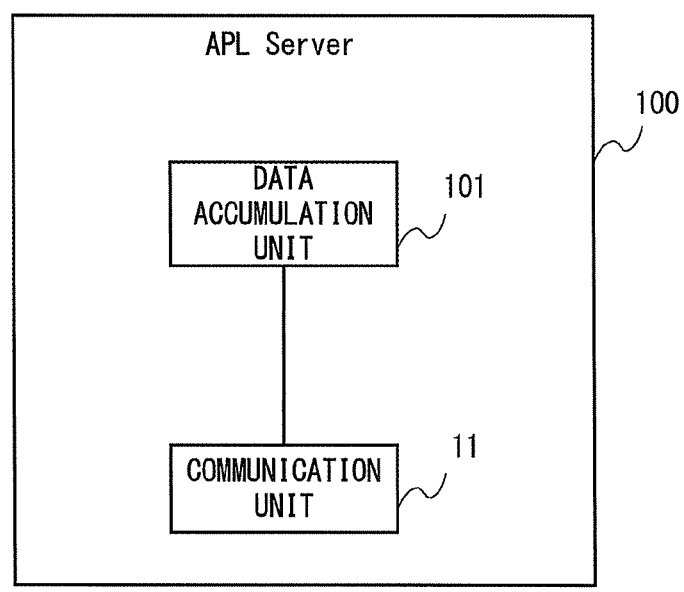
FIG. 8 is a configuration diagram of an application server according to a fourth exemplary embodiment.

Next, with reference to FIG. 8, a configuration example of an application server 100 according to a fourth exemplary embodiment of the present invention will be described. The application server 100 includes a communication unit 11 and a data accumulation unit 101. Since the communication unit 11 is similar to the communication unit 11 of the application server 10, detailed descriptions thereof will be omitted.

The application server 100 temporarily accumulates, when it transmits data whose size exceeds the upper limit of the data size that is predetermined in the SMS, transmission data in the data accumulation unit 101. When the M2M device 80 is connected to the mobile network 75 as a result of the execution of the Device Trigger function by the M2M platform 60, the application server 100 performs the IP data communication, to thereby transmit the data accumulated in the data accumulation unit 101 to the M2M device 80.

Figure 9:
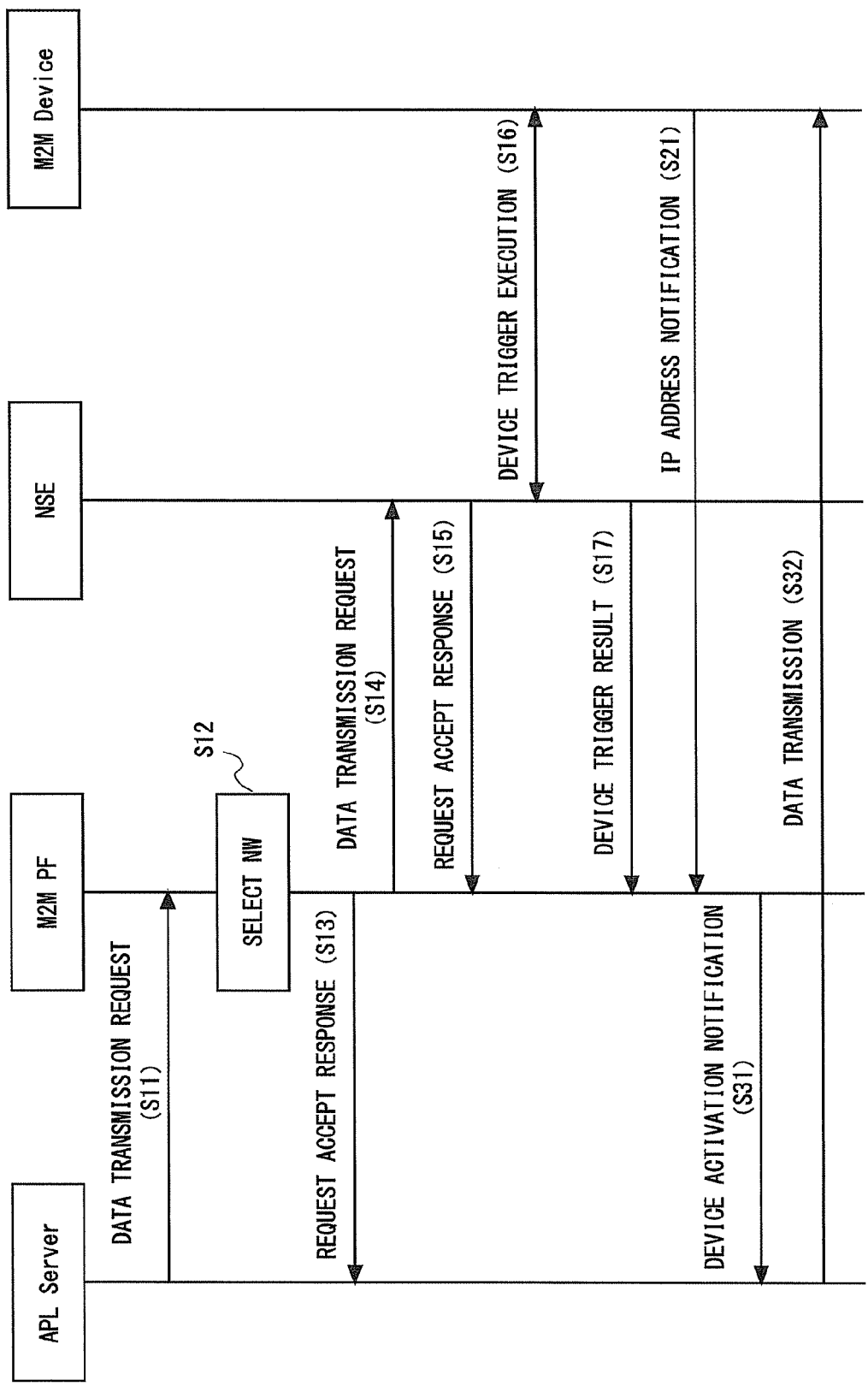
FIG. 9 is a diagram showing a flow of data transmission processing according to the fourth exemplary embodiment.

Next, with reference to FIG. 9, a flow of processing when data whose size exceeds the size of the data that can be transmitted in the Device Trigger function has been transmitted from the application server 50 will be described. The M2M platform in FIG. 9 corresponds to the M2M platform 60 described with reference to FIG. 4.

Since Steps S11 to S17 and Step S21 are similar to Steps S11 to S17 and Step S21 in FIG. 7, detailed descriptions thereof will be omitted.

Upon receiving the IP address notification message from the M2M device 80 in Step S21, the M2M platform 60 transmits a device activation notification message to the application server 100 (S31). The device activation notification message is used to notify the application server 100 of the IP address allocated to the M2M device 80 as a result of the connection of the M2M device 80 to the mobile network 75. Further, the M2M platform 60 may notify the application server 50 whether the target M2M device 80 has been connected to the mobile network 75 when the device trigger has been executed using the device activation notification message.

Next, upon receiving the IP address of the M2M device 80, the application server 100 transmits the data accumulated in the data accumulation unit 101 to the M2M device 80 by the IP data communication (S32).

As described above, by using the flow of the data transmission processing according to the fourth exemplary embodiment of the present invention, similar to the third exemplary embodiment, the application server 100 is able to transmit to the M2M device 80 the data that cannot be transmitted when the SMS is used since the upper limit of the data size is predetermined in the SMS by the IP data communication.

Fifth Exemplary Embodiment

Figure 10:
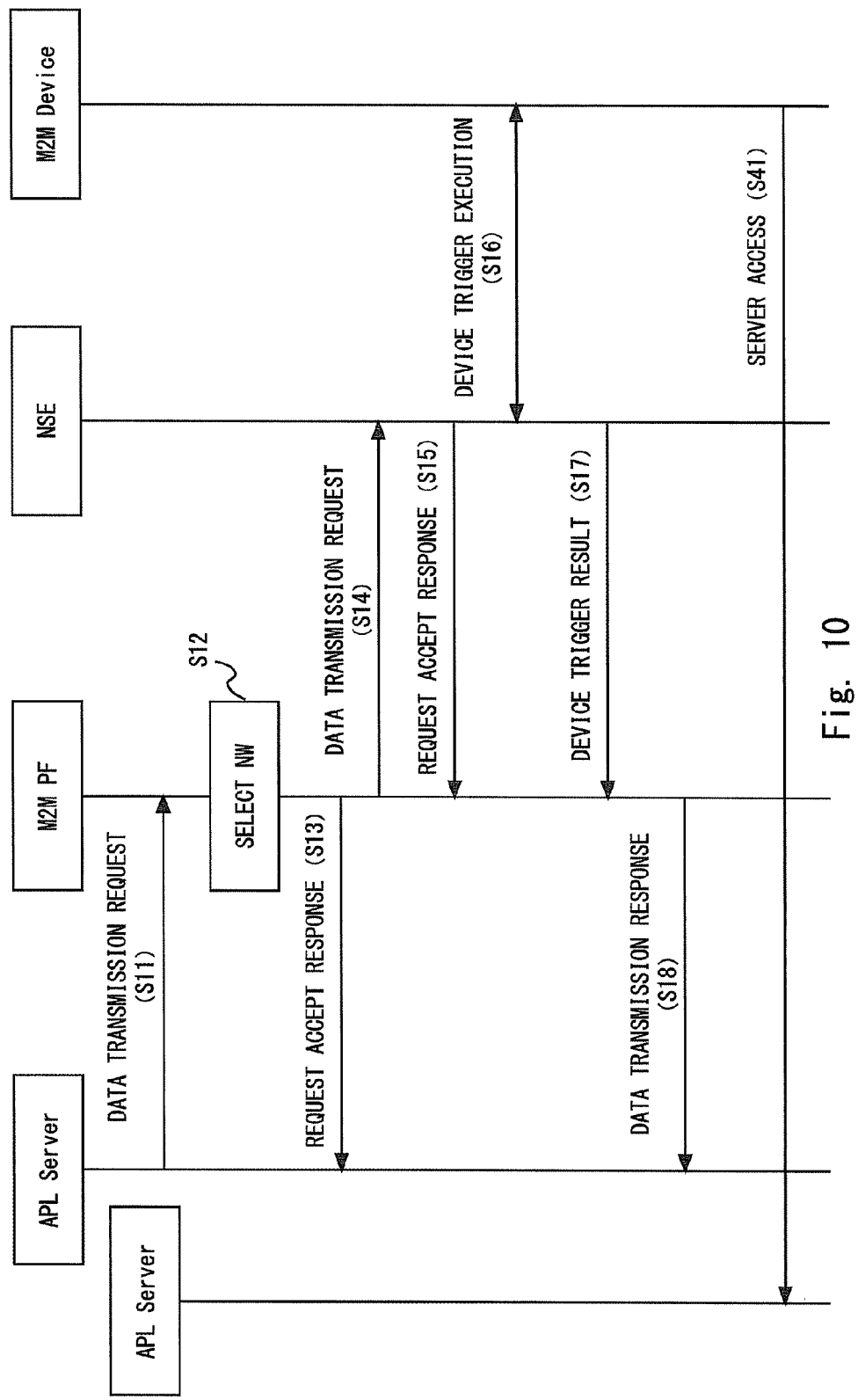
FIG. 10 is a diagram showing a flow of data transmission processing according to a fifth exemplary embodiment.

Next, with reference to FIG. 10, a flow of data transmission processing according to a fifth exemplary embodiment of the present invention will be described. Since Steps S11 to S18 are similar to Steps S11 to S18 of FIG. 4, detailed descriptions thereof will be omitted. Note that, in Step S11, the application server 50 transmits a data transmission request message in which an action that should be executed by the M2M device 80 that has received the message has been set.

The action that should be executed by the M2M device 80 includes, for example, access to the specific server by the M2M device 80, transmission of data to a specific server from the M2M device 80, disconnection of a power supply of the M2M device 80, changes in settings in the M2M device 80, or other predetermined emergency operations.

Further, in Step S14, the M2M platform 60 converts the format of the message into the message of the predetermined format and transmits the data transmission request message to the NSE 70 so that the M2M device 80 is able to execute the action content set in the message upon receiving the message. That is, when the action content is set in the message of the predetermined format, the M2M device 80 is able to execute the action according to the action content that has been set. In other words, when the action content is set in the message that does not comply with the predetermined format, the M2M device 80 cannot execute the action that has been set. In this example, it is assumed that, in Step S16, the M2M device 80 has received the message that requires access to a specific server as the action content.

In this case, the M2M device 80 accesses the application server that has been specified according to the action contents set in the message that has been received (S41).

As described above, upon receiving the message in which the action content has been set from the application server 50, the M2M platform 60 is able to convert the format of the message into a message of a predetermined format and transmit the message of the predetermined format to execute the action in the M2M device 80. The application server 50 therefore needs not generate a message of a format required in the M2M device 80. That is, the M2M platform 60 is able to convert the format of the message used in the application server 50 and the format of the message defined in the M2M device 80. It is therefore possible to reduce the burden of the processing of generating the message that is transmitted to cause the M2M device 80 to execute the action in the application server 50.

Sixth Exemplary Embodiment

Next, a method of specifying the M2M device 80 according to a sixth exemplary embodiment of the present invention will be described. In the first to fifth exemplary embodiments, the case in which the application server 50 uses the identifier that directly specifies the M2M device 80 has been described. On the other hand, the application server 50 may transmit a data transmission request message in which information on a group including the M2M device 80 is specified to the M2M platform 60 instead of specifying the identifier of the M2M device 80. The group information may be, for example, the location where the message is transmitted, the office, or the type of the terminal that transmits the message. Further, the group information may be a group including the M2M device 80 in which the residual amount of battery exceeds the threshold. The M2M platform 60 extracts the plurality of M2M devices 80 corresponding to the group information transmitted from the application server 50 and converts the destination of the message into an External-ID of the M2M device 80 that has been extracted.

As described above, since the application server 50 specifies the group including the M2M device 80, only one data transmission request message in which the group is specified can be transmitted instead of transmitting a plurality of messages in which the destinations are specified for the respective M2M devices 80. It is therefore possible to reduce the number of messages communicated between the application server 50 and the M2M platform 60.

While the present invention has been described as a configuration of the hardware in the above exemplary embodiments, the present invention is not limited thereto. The present invention can achieve the processing in the distribution server 10, the broadcast distribution server 20, and the communication terminal 30 by causing a central processing unit (CPU) to execute a computer program.

In the above example, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, needless to say, the present invention is not limited to the exemplary embodiments stated above and various changes can be made to the present invention without departing from the spirit of the present invention.

While the present invention has been described with reference to the exemplary embodiments, the present invention is not limited to the above exemplary embodiments. Various changes that can be understood by those skilled in the art can be made to the configurations and the details of the present invention within the scope of the present invention.

This application is based upon and claims the benefit of priority from Japanese Patent Application No. 2013-242223, filed on Nov. 22, 2013, the disclosure of which is incorporated herein in its entirety by reference.

REFERENCE SIGNS LIST

10 APPLICATION SERVER
11 COMMUNICATION UNIT
20 RELAY APPARATUS
21 CONVERTER
22 COMMUNICATION UNIT
30 COMMUNICATION TERMINAL
40 COMMUNICATION NETWORK
50 APPLICATION SERVER
60 M2M PLATFORM
61 NETWORK SELECTION UNIT
62 CONVERTER
63 COMMUNICATION UNIT
70 NSE
75 MOBILE NETWORK
77 COMMUNICATION NETWORK
79 COMMUNICATION NETWORK
80 M2M DEVICE
90 M2M PLATFORM
91 DATA ACCUMULATION UNIT
100 APPLICATION SERVER
101 DATA ACCUMULATION UNIT

The invention claimed is:

1. A communication system comprising:
an application server; and
a relay apparatus, wherein:
the application server comprises:
at least one memory storing instructions, and
at least one processor configured to execute the instructions to:
transmit to the relay apparatus a first message in which a first identifier has been set as a destination, the first identifier identifying a communication terminal that performs communication via a mobile network and being managed by the application server;
the relay apparatus comprises:
at least one memory storing instructions, and
at least one processor configured to execute the instructions to:
relay a communication between the application server and the mobile network;
convert the first identifier into an External identifier that uniquely identifies the communication terminal in the mobile network; and
transmit a second message in which the External identifier has been set as a destination to the communication terminal via the mobile network.

2. The communication system according to claim 1, wherein:
the relay apparatus is connected to a plurality of mobile networks,
the at least one processor of the relay apparatus is further configured to execute the instructions to select, upon receiving the first message transmitted from the application server, a mobile network among the plurality of mobile networks which can communicate with the communication terminal, and
transmit the second message to the communication terminal via the selected mobile network.

3. The communication system according to claim 2, wherein the at least one processor of the relay apparatus is further configured to execute the instructions to convert the format of the first message into a message format used in the selected mobile network and generate the second message.

4. The communication system according to claim 1, wherein:
when a size of the second message that can be communicated in the mobile network is predetermined and a third message having a size that exceeds the predetermined size is transmitted from the application server,
the second communication unit transmits the second message having a size that does not exceed the predetermined size to the communication terminal to cause the communication terminal to be connected to the mobile network, and sets a third identifier that has been newly allocated to the communication terminal from the mobile network as a destination to transmit the third message to the communication terminal.

5. The communication system according to claim 1, wherein:
when a size of the second message that can be communicated in the mobile network is predetermined and a third message having a size that exceeds the predetermined size is transmitted from the application server,
the at least one processor of the relay apparatus is further configured to execute the instructions to transmit the second message having a size that does not exceed the predetermined size to the communication terminal to cause the communication terminal to be connected to the mobile network, and notify the application server of a third identifier that has been newly allocated to the communication terminal from the mobile network, and
the at least one processor of the application server is further configured to execute the instructions to transmit the third message in which the third identifier has been set as a destination to the communication terminal.

6. The communication system according to claim 4, wherein the at least one processor of the relay apparatus is further configured to execute the instructions to receive information regarding the third identifier transmitted from the communication terminal.

7. The communication system according to claim 4, wherein the at least one processor of the relay apparatus is further configured to execute the instructions to receive information regarding the third identifier transmitted from a node apparatus in the mobile network that has allocated the third identifier to the communication terminal.

8. The communication system according to claim 1, wherein the communication terminal executes, when an instruction is defined using a parameter having a predetermined format in the second message transmitted via the mobile network, processing that is specified by the instruction.

9. The communication system according to claim 1, wherein:
the mobile network is a network including a node apparatus defined by the 3GPP, and
the External identifier is an External Identifier defined by the 3GPP.

10. The communication system according to claim 1, wherein the at least one processor of the relay apparatus is further configured to execute the instructions to transmit the second message to the communication terminal using a short message service (SMS).

11. A relay apparatus comprising:
at least one memory storing instructions, and
at least one processor configured to execute the instructions to:
relay a communication between an application server and a mobile network;
convert, upon receiving a first message transmitted from the application server, a first identifier into an External identifier, the first identifier being a destination of the first message, identifying a communication terminal that performs communication via the mobile network and being managed by the application server, and the External identifier uniquely identifying the communication terminal in the mobile network; and
transmit a second message in which the External identifier has been set as a destination to the communication terminal via the mobile network.

12. The relay apparatus according to claim 11, wherein the at least one processor of the relay apparatus is further configured to execute the instructions to select, upon receiving the first message transmitted from the application server, a mobile network among the plurality of mobile networks which can communicate with the communication terminal, and
transmit the second message to the communication terminal via the selected mobile network.

13. The relay apparatus according to claim 12, wherein the at least one processor of the relay apparatus is further configured to execute the instructions to convert the format of the first message into a message format used in the selected mobile network and generate the second message.

14. The relay apparatus according to claim 11, wherein:
when a size of the second message that can be communicated in the mobile network is predetermined and a third message having a size that exceeds the predetermined size is transmitted from the application server,
the at least one processor of the relay apparatus is further configured to execute the instructions to transmit the second message having a size that does not exceed the predetermined size to the communication terminal to cause the communication terminal to be connected to the mobile network, and set a third identifier that has been newly allocated to the communication terminal from the mobile network as a destination to transmit the third message to the communication terminal.

15. The relay apparatus according to claim 11, wherein:
when a size of the second message that can be communicated in the mobile network is predetermined and a third message having a size that exceeds the predetermined size is transmitted from the application server, and
the at least one processor of the relay apparatus is further configured to execute the instructions to transmit the second message having a size that does not exceed the predetermined size to the communication terminal to cause the communication terminal to be connected to the mobile network, and notify the application server of a third identifier that has been newly allocated to the communication terminal from the mobile network.

16. The relay apparatus according to claim 14, wherein the at least one processor of the relay apparatus is further configured to execute the instructions to receive information regarding the third identifier transmitted from the communication terminal.

17. The relay apparatus according to claim 14, wherein the at least one processor of the relay apparatus is further configured to execute the instructions to receive information regarding the third identifier transmitted from a node apparatus in the mobile network that has allocated the third identifier to the communication terminal.

18. A communication method used in a relay apparatus that relays a communication between an application server and a mobile network, the communication method comprising:
- receiving a first message in which a first identifier that identifies a communication terminal that performs communication via the mobile network has been set as a destination, the first message being transmitted from the application server and being managed by the application server;
- converting the first identifier into an External identifier that uniquely identifies the communication terminal in the mobile network; and
- transmitting a second message in which the External identifier has been set as a destination to the communication terminal via the mobile network.

19. A non-transitory computer readable medium that stores a program executed by a computer apparatus, the computer apparatus relaying a communication between an application server and a mobile network, the program causing the computer to execute the following processing of:
- receiving a first message in which a first identifier that identifies a communication terminal that performs communication via the mobile network has been set as a destination, the first message being transmitted from the application server and being managed by the application server;
- converting the first identifier into an External identifier that uniquely identifies the communication terminal in the mobile network; and
- transmitting a second message in which the External identifier has been set as a destination to the communication terminal via the mobile network.

* * * * *